United States Patent [19]

Mizutani

[11] Patent Number: 4,486,497
[45] Date of Patent: Dec. 4, 1984

[54] LAMINATED MATERIAL

[75] Inventor: Makoto Mizutani, Sodegaura, Japan

[73] Assignee: Idemitsu Kosan Company Limited, Tokyo, Japan

[21] Appl. No.: 395,966

[22] Filed: Jul. 7, 1982

[30] Foreign Application Priority Data

Jul. 18, 1981 [JP] Japan .................. 56-112843

[51] Int. Cl.$^3$ .................. C09H 7/02; B32B 15/08
[52] U.S. Cl. .................. 428/332; 428/344; 428/355; 428/461; 428/516; 525/78
[58] Field of Search ............... 428/461, 343, 344, 355, 428/518, 522, 500, 332; 525/78

[56] References Cited

U.S. PATENT DOCUMENTS

| | | | |
|---|---|---|---|
| 3,658,948 | 4/1972 | McConnell | 260/897 B |
| 3,856,889 | 12/1974 | McConnell | 260/897 B |
| 3,868,433 | 2/1975 | Bartz et al. | 260/876 R |
| 4,087,588 | 5/1978 | Shida et al. | 428/521 |
| 4,254,169 | 3/1981 | Schroeder | 428/518 |
| 4,350,740 | 9/1982 | Coran | 428/461 |

FOREIGN PATENT DOCUMENTS 2059340  4/1981  United Kingdom .

Primary Examiner—George F. Lesmes
Assistant Examiner—E. Rollins Buffalow
Attorney, Agent, or Firm—Frishauf, Holtz, Goodman & Woodward

[57] ABSTRACT

A laminated material comprising an aluminum or polypropylene substrate and a resin composition layer coated on the substrate is described, wherein the composition layer comprises from 60 to 99.9% by weight of an ethylene-based copolymer and from 40 to 0.1% by weight of polypropylene modified with unsaturated carboxylic acid or its anhydride, and the composition layer is coated on the substrate by an extrusion lamination method. This laminated material has excellent physical and chemical properties, and is very useful as a wrapping material, particularly for use in automatic wrapping of foods, drinks, tools, and so forth.

13 Claims, 1 Drawing Figure

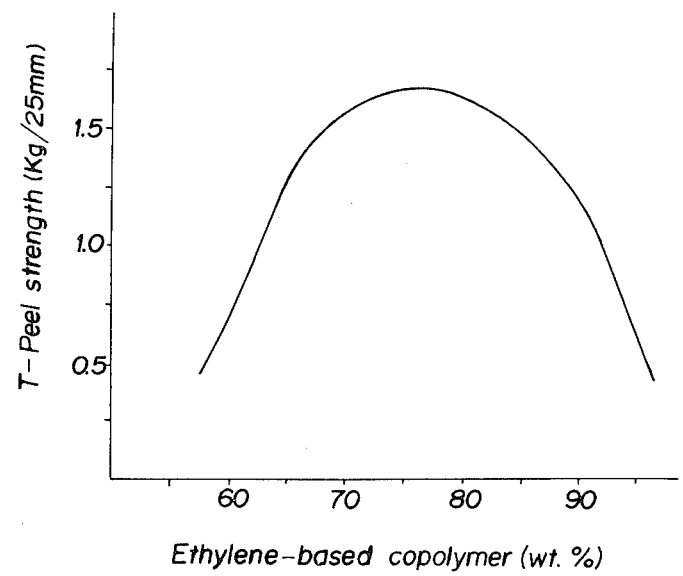

LAMINATED MATERIAL

BACKGROUND OF THE INVENTION

1. Field of the Invention

The present invention relates to a laminated material, and more particularly, to a laminated material comprising an aluminum or polypropylene substrate and an ethylene copolymer resin composition layer firmly bonded to the substrate.

2. Description of the Prior Art

Aluminum foil or plate and polypropylene film or sheet are in widespread use as, for example, wrapping materials and industrial materials. These aluminum or polypropylene materials, however, are limited in their usefulness because they are not always satisfactory in all respects of necessary properties such as strength, heat resistance, water resistance, chemical resistance, gas permeability, printing properties, etc. One or more materials, therefore, have been laminated on aluminum or polypropylene to improve their properties so that they can be utilized in many industrial applications.

This lamination can be performed, for example, by using a solution type adhesive. This method, however, has many problems resulting from the use of solvents, such as bad working conditions and complicated process steps. With the advance in the automatic charge-wrapping system of, e.g., foods, drinks, etc., a method using a hot melt type adhesive is used in place of the aforenoted solution type adhesive. Ethylene-based copolymers such as an ethylene-vinyl acetate copolymer, etc. have been most widely used as the adhesive in such hot melt type adhesive processes. These ethylene-based copolymers, however, have insufficient adhesive strength and, therefore, it is necessary to use higher temperature and pressure when bonding or to physically or chemically treat the surface of the aluminum or polypropylene substrate, or to use supplementary adhesives.

In order to overcome the above-described problems of ethylene-based copolymer adhesives, it has been proposed to mix a modified polyolefin prepared by treating polyolefin with an unsaturated carboxylic acid or a derivative, or a resin which increases adhesion, or a low molecular weight resin, or the like with the ethylene-based copolymer. For example, known laminated materials include a composition consisting of an ethylene-vinyl acetate copolymer and a modified polypropylene, and a nylon substrate (Japanese Patent Publication No. 11032/1978), a laminated material comprising a composition consisting of low density polyethylene and a modified polypropylene, and a nylon (Japanese Patent Application Laid-Open No. 26548/1977), and a laminated material prepared by providing a layer of a composition consisting of a modified polypropylene, unmodified polypropylene and low density polyethylene or an ethylene-vinyl acetate copolymer on an aluminum plate (Japanese Patent Application Laid-Open No. 21850/1981).

The addition of such modified polyolefins or resins which improve adhesion or low molecular weight resins, however, fails to overcome the problems of ethylene-based copolymers. For example, a composition consisting of an ethylene-based copolymer and a modified ethylene-based polymer does not have sufficient high adhesion properties, and a composition containing resin that improves adhesion or a low molecular weight resin has insufficient heat resistance. Thus, laminated materials prepared using such compositions have only limited applications. It is further known that processes for lamination of such compositions containing an ethylene-based copolymer with another material required special procedures, and that the adhesive strength obtained may be insufficient depending on the material used. Therefore, the choice of an optimum material is performed by trial and error. Laminated materials prepared using a nylon resin can be used as wrapping materials, particularly in applications where ordinary storage and rot-proof properties are required, due to the excellent gas barrier properties of nylon, However, they are not suitable for use in applications where moisture-absorption must be prevented.

When laminating an ethylene-based copolymer resin composition layer on a metallic material such as aluminum or a polypropylene substrate, it is necessary to apply a preliminary treatment as described hereinbefore since the adhesion between the metallic material or polypropylene substrate and the ethylene-based copolymer resin composition layer is insufficient. In addition, when an extrusion lamination method is employed, it is essential that the metallic material or polypropylene substrate is coated with an anchor coating (priming) agent or is preliminarily heated. Particularly, in the case of the polypropylene substrate, there has been employed a method generally called "dry lamination" in which an adhesive is dissolved in, e.g., an organic solvent and is coated on both the polypropylene substrate and the other resin layer, which are then laminated together, since there are almost no resins exhibiting good adhesion to polypropylene. This method, however, suffers from problems such as scatter of solvent. Moreover, in the lamination of a resin composition layer consisting of an ethylene-based copolymer and modified polypropylene on an aluminum substrate, the relationship between the proportions of components in the composition and adhesion properties has not been determined.

SUMMARY OF THE INVENTION

It has been discovered that when a resin composition layer containing an ethylene-based copolymer and a modified polypropylene in specific proportions, said modified polypropylene being prepared by treating polypropylene with an unsaturated carboxylic acid or its anhydride, is laminated on an aluminum or polypropylene substrate, a laminated material in which the composition layer and the substrate are firmly bonded together is formed. This lamination can be performed by an extrusion lamination method.

The present invention provides a laminated material comprising an aluminum or polypropylene substrate and a resin composition layer bonded on the substrate by an extrusion lamination method, said composition layer consisting of from 60 to 99.9% by weight of an ethylene-based copolymer selected from the group consisting of an ethylene-vinyl acetate copolymer, an ethylene-ethyl acrylate copolymer, and an ethylene-butene-1 copolymer, and from 40 to 0.1% by weight of polypropylene modified with an unsaturated carboxylic acid or its anhydride.

BRIEF DESCRIPTION OF THE DRAWINGS

The sole FIGURE is a graph showing the relationship between the proportion of ethylene-based copolymer blend and the T-peel strength.

DETAILED DESCRIPTION OF THE INVENTION

The ethylene-based copolymers of the present invention have an ethylene content of from 1 to 99.9 mol% and preferably from 2 to 99 mol%. The type and comonomer content of the ethylene-based copolymer can be determined depending on the type of the substrate, the purpose for which the ultimate laminated material is used, and so forth. Heat adhesion properties are poor when the comonomer content is less than 0.1 mol%. The melt index (M.I.) of the ethylene-based copolymer is from 0.05 to 1,000 grams per 10 minutes and preferably from 0.1 to 500 grams per 10 minutes. In choosing the type of the ethylene-based copolymer, conditions such as the lamination temperature must be taken into consideration. Preferably the ethylene content is from 40 to 99 mol% and the melt index is from 0.1 to 500 grams per 10 minutes.

The term "modified polypropylene", "polypropylene modified with unsaturated carboxylic acid or its anhydride" and "polypropylene-unsaturated carboxylic acid product" (which includes the anhydride equivalent) is used herein to include both the polypropylene modified with unsaturated carboxylic acid or its anhydride and a mixture of unmodified polypropylene and modified polypropylene. The term "polyproplyene" as used herein means a propylene homopolymer, and a block copolymer, random copolymer of propylene and other monomers such as ethylene containing at least 80% by weight of polypropylene and preferably at least 90% by weight of polypropylene. Unsaturated carboxylic acids which can be used in the modification of polypropylene include acrylic acid, methacrylic acid, maleic acid, fumaric acid, itaconic acid, crotonic acid, citraconic acid, sorbic acid, mesaconic acid, and angelic acid. The anhydrides can also be used. The procedure of the modification is disclosed in Japanese Patent Application Laid-Open No. 21850/1981, etc.

Modification of polypropylene with an unsaturated carboxylic acid or its anhydride can be carried out by known techniques. For example, polypropylene and maleic anhydride are heated along with a radical initiator in the presence or absence of a solvent. In this reaction, vinyl monomers such as styrene, or rubbers such as liquid rubber and thermoplastic rubber may coexist.

The unsaturated carboxylic acid or its anhydride content of the modified polypropylene as noted hereinbefore is usually from 0.001 to 15% by weight, preferably from 0.005 to 10% by weight and more preferably at least about 1%.

The proportion of the ethylene-based copolymer in the composition of the invention is from 60 to 99.9% by weight and preferably from 65 to 92.5% by weight, and the proportion of the modified polypropylene is from 40 to 0.1% by weight and preferably from 35 to 7.5% by weight. If the proportion of the modified polypropylene is outside the above-specified range, the adhesion properties of the resulting composition will be poor.

If desired, auxiliary components of resins such as filler, antioxidant, ultraviolet absorber, antistatic agent, and a dispersing agent may be added to the composition.

The above-prepared composition of the invention is provided in the form of a layer (coating) on an aluminum substrate which is in the form of foil, plate or the like, or a polypropylene substrate which is in film or sheet form.

Although the laminated material of the invention can be prepared by various known techniques, it is industrially preferred to employ extrusion lamination. In the method used in this invention, pre-treatments such as pre-heating of the substrate and coating of an anchor coating agent are not required. Furthermore, high-speed molding is possible because of the excellent adhesion properties of the composition used herein.

In carrying out extrusion lamination, it is suitable that the temperature of the resin composition is from 170° to 240° C., the temperature of cooling roll is from 10° to 20° C., the linear pressure is from 2 to 10 kilograms per centimerer(kg/cm), and the take-off speed is from 3 to 150 meters per minute (preferably from 20 to 100 meters per minute).

The thickness of the components of the laminated material may be decided according to the applications and the like of said laminated material, and in general, the thickness of the aluminum or polypropylene substrate is from 20 to 100μ, preferably from 30 to 60μ, and that of a resin composition is from 10 to 150μ, preferably from 20 to 120μ.

The laminated material of the invention is suitable for use in wrapping articles which desirably do not absorb moisture because the laminate is made mainly of aluminum or polypropylene. In addition, the laminated material of the invention has excellent heat resistance, heat sealing properties, anti-blocking properties, and chemical resistance because of the use of the ethylene-based copolymer. Thus, the laminated material of the invention is very useful as a wrapping material and can be appropriately used as a wrapping material for use in automatic wrapping system of foods, drinks, tools, and so forth.

The following examples and comparative examples are given to illustrate the invention in greater detail.

EXAMPLES 1 TO 9 AND COMPARATIVE EXAMPLES 1 TO 11

An ethylene-based copolymer and modified polypropylene (or moldified polyethylene) as shown in Table 1 were compounded in the predetermined ratio, and the resulting mixture was coated as a layer on an aluminum or polypropylene substrate by extrusion lamination under the conditions described hereinafter to prepare a laminated material. The thicknesses of the resin layer, the aluminum substrate, and the polypropylene substrate were about 100 microns, 40 microns, and 100 microns, respectively.

The thus-prepared laminated material was cut out into a 25 millimeter (mm) width, and its T-peel strength was measured in accordance with JIS-K-6845. The results are shown in Table 1. On basis of the results obtained in Examples 1 to 4, the relation between the proportion of ethylene-based copolymer blend and the T-peel strength is shown in the FIGURE.

Extrusion Lamination Conditions

Resin temperature: 200° C.
Cooling roll temperature: 16° C.
Linear pressure: about 5 kilograms per centimeter (kg/cm)
Take-off speed: 4.5 meters per minute (m/min)

TABLE 1

| | Com. Ex. 1 | Ex. 1 | Ex. 2 | Ex. 3 | Ex. 4 | Com. Ex. 2 | Com. Ex. 3 | Com. Ex. 4 | Ex. 5 | Com. Ex. 5 |
|---|---|---|---|---|---|---|---|---|---|---|
| Ethylene-Based Copolymer | | | | | | | | | | |
| Ethylene-Vinyl Acetate Copolymer (A)*[1] | 100 | 95 | 90 | 80 | 60 | 20 | 0 | — | — | — |
| Ethylene-Vinyl Acetate Copolymer (B)*[2] | — | — | — | — | — | — | — | 100 | 90 | — |
| Ethylene-Ethyl Acrylate Copolymer*[3] | — | — | — | — | — | — | — | — | — | 100 |
| Ethylene-Butene-1 Copolymer*[4] | — | — | — | — | — | — | — | — | — | — |
| Modified Polyolefin | | | | | | | | | | |
| Modified Random Polypropylene*[5] | 0 | 5 | 10 | 20 | 40 | 80 | 100 | 0 | 10 | 0 |
| Modified Polypropylene*[6] | — | — | — | — | — | — | — | — | — | — |
| Modified High Density Polyethylene*[7] | — | — | — | — | — | — | — | — | — | — |
| Modified Low Density Polyethylene*[8] | — | — | — | — | — | — | — | — | — | — |
| Low Density Polyethylene*[9] | — | — | — | — | — | — | — | — | — | — |
| Substrate*[10] | Al | Al | Al | Al | Al | Al | Al | Al | Al | Al |
| T-Peel Strength (kg/25 mm) | 0.05 | 0.54 | 1.25 | 1.60 | 0.70 | 0.20 | 0.20 | 0.02 | >0.80 | 0 |

| | Ex. 6 | Com. Ex. 6 | Ex. 7 | Com. Ex. 7 | Ex. 8 | Ex. 9 | Com. Ex. 8 | Com. Ex. 9 | Com. Ex. 10 | Com. Ex. 11 |
|---|---|---|---|---|---|---|---|---|---|---|
| Ethylene-Based Copolymer | | | | | | | | | | |
| Ethylene-Vinyl Acetate Copolymer (A)*[1] | — | — | — | — | — | — | — | — | — | — |
| Ethylene-Vinyl Acetate Copolymer (B)*[2] | — | — | — | 100 | 90 | 90 | — | — | 90 | 90 |
| Ethylene-Ethyl Acralate Copolymer*[3] | 90 | — | — | — | — | — | — | — | — | — |
| Ethylene-Butene-1 Copolymer*[4] | — | 100 | 90 | — | — | — | — | — | — | — |
| Modified Polyolefin | | | | | | | | | | |
| Modified Random Polypropylene*[5] | 10 | 0 | 10 | 0 | 10 | — | 0 | 10 | — | — |
| Modified Polypropylene*[6] | — | — | — | — | — | 10 | — | — | — | — |
| Modified High Density Polyethylene*[7] | — | — | — | — | — | — | — | — | 10 | — |
| Modified Low Density Polyethylene*[8] | — | — | — | — | — | — | — | — | — | 10 |
| Low Density Polyethylene*[9] | — | — | — | — | — | — | 100 | 90 | — | — |
| Substrate*[10] | Al | Al | Al | PP | PP | Al | Al | Al | Al | Al |
| T-Peel Strength (kg/25 mm) | 0.45 | 0 | 0.35 | 0.01 | 1.20 | >0.80 | 0 | 0.05 | 0.03 | 0.03 |

Notes:
*[1]MI = 3, Vinyl acetate content = 25% by weight
*[2]MI = 60, Vinyl acetate content = 32% by weight
*[3]MI = 1.5, Ethyl acrylate content = 15% by weight
*[4]MI = 1.7, Butene-1 content = 3.4 mol %
*[5]Maleic anhydride content = 5% by weight
*[6]Maleic anhydride content = 1.6% by weight
*[7]Maleic anhydride content = 1.3% by weight
*[8]Maleic anhydride content = 2.3% by weight
*[9]MI = 23, Density = 0.916
*[10]Al: aluminum; PP: polypropylene

EXAMPLE 10 AND COMPARATIVE EXAMPLE 12

An ethylene-based copolymer and modified polypropylene as shown in Table 2 were compounded in the predetermined ratio, and the resulting mixture was coated in layer form on a 40 micron thick aluminum substrate by extrusion lamination with a resin temperature of 230° C., take-off speed of 5 meters per minute, cooling roll temperature of 16° C., and linear pressure of about 5 kilograms per centimeter to prepare a laminated material. In the thus-prepared laminated material, the thickness of the resin layer was 60 microns. The T-peel strength of the laminated material was measured, and the results are shown in Table 2.

TABLE 2

| | Example 10 | Comparative Example 12 |
|---|---|---|
| Ethylene-Vinyl Acetate Copolymer*[1] | 90 | — |
| Low Density Polyethylene*[2] | — | 10 |
| Polypropylene*[3] | — | 75 |
| Modified Polypropylene*[4] | 10 | 15 |
| T-Peel Strength (kg/25 mm) | 1.0 | 0.1 |

Note:
*[1]MI = 15, Vinyl acetate content = 15% by weight
*[2]MI = 2, Density = 0.91
*[3]MI = 7, Random copolymer having an ethylene content of 3% by weight
*[4]Maleic anhydride content = 5% by weight

What is claimed is:
1. A laminated material comprising an aluminum or polypropylene substrate and a resin composition layer provided on the substrate by an extrusion lamination method, said composition layer consisting essentially of from 60 to 92.5% by weight of an ethylene copolymer selected from the group consisting of ethylene-vinyl acetate copolymers, ethylene-ethyl acrylate copolymers, and ethylene-butene-1 copolymers, said copolymers containing between 40 and 99 mol% of ethylene, and from 40 to 7.5% by weight of a reaction product of polypropylene and maleic acid or anhydride thereof, wherein the amount of said unsaturated carboxylic acid or anhydride thereof is between 0.005 and 10% by weight.

2. The laminated material of claim 1, wherein said composition layer contains from 65 to 92.5% by weight of said ethylene-based copolymer and from 35 to 7.5% by weight of said polypropylene-unsaturated carboxylic acid product.

3. The laminated material of claim 2, wherein said maleic acid component is in an amount between about 1 and 10% by weight.

4. The laminated material of claim 2, wherein the melt index of said ethylene-copolymer is between 0.005 and 1,000 grams per 10 minutes.

5. The laminated material of claim 4, wherein the melt index of said ethylene-copolymer is between 0.1 and 500 grams per 10 minutes.

6. The laminated material of claim 1, wherein said maleic acid component is in an amount between about 1 and 10% by weight.

7. The laminated material of claim 1, wherein the melt index of said ethylene-copolymer is between 0.005 and 1,000 grams per 10 minutes.

8. The laminated material of claim 7, wherein the melt index of said ethylene-copolymer is between 0.1 and 500 grams per 10 minutes.

9. The laminated material of claim 1 further comprising at least one additive selected from the group consisting of a filler, an antioxidant, an ultraviolet absorber, an antistatic agent and a dispersing agent.

10. The laminated material of claim 1, wherein the thickness of the resin composition layer is between 10 and 150μ.

11. A laminated material comprising an aluminum or polypropylene substrate and a resin composition layer provided on the substrate by an extrusion lamination method, said composition layer consisting essentially of from 65 to 92.5% by weight of an ethylene copolymer selected from the group consisting of ethylene-vinyl acetate copolymers, ethylene-ethyl acrylate copolymers, and ethylene-butene-1 copolymers, said copolymer containing between 40 and 99 mol% of ethylene, and from 35 to 7.5% by weight of a reaction product of polypropylene and maleic acid or anydride thereof, said maleic acid or anhydride of said reaction product being present in an amount of between 0.005 to 10% by weight.

12. The laminated material of claim 11 further comprising at least one additive selected from the group consisting of a filler, an antioxidant, an ultraviolet absorber, an antistatic agent and a dispersing agent.

13. The laminated material of claim 11 wherein the thickness of the composition layer is between 10 and 150μ.

* * * * *